United States Patent [19]

Rees

[11] Patent Number: 4,967,122
[45] Date of Patent: Oct. 30, 1990

[54] DIGITAL SYNCHRONIZING CIRCUIT FOR BRUSHLESS DC MOTOR

[75] Inventor: Fenton L. Rees, Rockford, Ill.

[73] Assignee: Sundstrand Corporation, Rockford, Ill.

[21] Appl. No.: 319,727

[22] Filed: Mar. 7, 1989

[51] Int. Cl.$^5$ ............................................. H02K 29/02
[52] U.S. Cl. ...................................... 318/254; 318/138
[58] Field of Search ............................... 318/254, 138

[56] References Cited

U.S. PATENT DOCUMENTS

| | | | |
|---|---|---|---|
| 3,210,565 | 10/1965 | Rowe et al. | 307/88.5 |
| 3,628,114 | 12/1971 | Pattantyus | 318/175 |
| 3,706,923 | 12/1972 | Dunfield | 318/254 |
| 3,821,604 | 6/1974 | Walraven | 318/313 |
| 3,863,118 | 1/1975 | Lander et al. | 318/254 |
| 3,979,651 | 9/1976 | Bringol | 318/254 |
| 4,128,812 | 12/1978 | Pavlis | 328/133 |
| 4,353,016 | 10/1982 | Born | 318/254 |

OTHER PUBLICATIONS

Publication "Solid State Control of Ultra High Speed Compressor Motor" by Rees, et al.

Primary Examiner—Bernard Roskoski
Attorney, Agent, or Firm—Antonelli, Terry, Stout & Kraus

[57] ABSTRACT

An acceleration system (10) for a brushless DC motor (12) is disclosed having the functional capability of rapid acceleration through one or more mechanical resonance points with electronic commutation of the windings being controlled by pulses generated by sensing the position and rotational velocity of the rotor of the motor and further having the functional capability of synchronous operation in a speed range above the mechanical resonance points. The invention permits rapid acceleration which would be difficult if the motor were accelerated in the synchronous mode of operation controlled by an external pulse source (20). The invention precisely synchronizes switching control of electronic commutation of the windings of a brushless DC motor from pulses generated by a position detector (14) which detects the position and velocity of the rotor to pulses generated by an external signal source which is used during the synchronous mode of operation of the brushless DC motor (12). The time at which switching occurs is precisely controlled by switching when the frequency of the pulses generated internally by detecting the position and rotational velocity of the rotor is equal to or greater than the frequency of the pulses generated by the external pulse source and at least a partial overlap exists between high level states of the pulses.

20 Claims, 2 Drawing Sheets

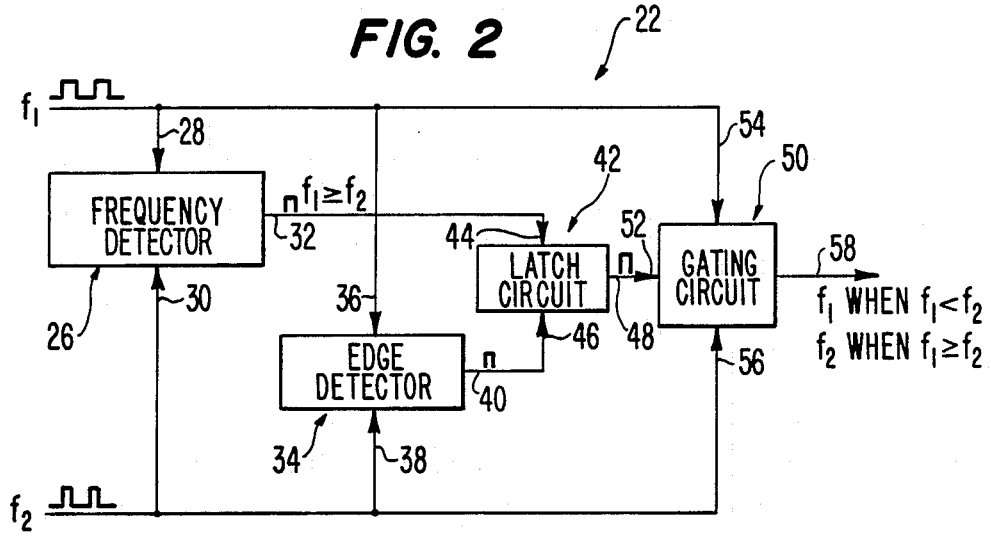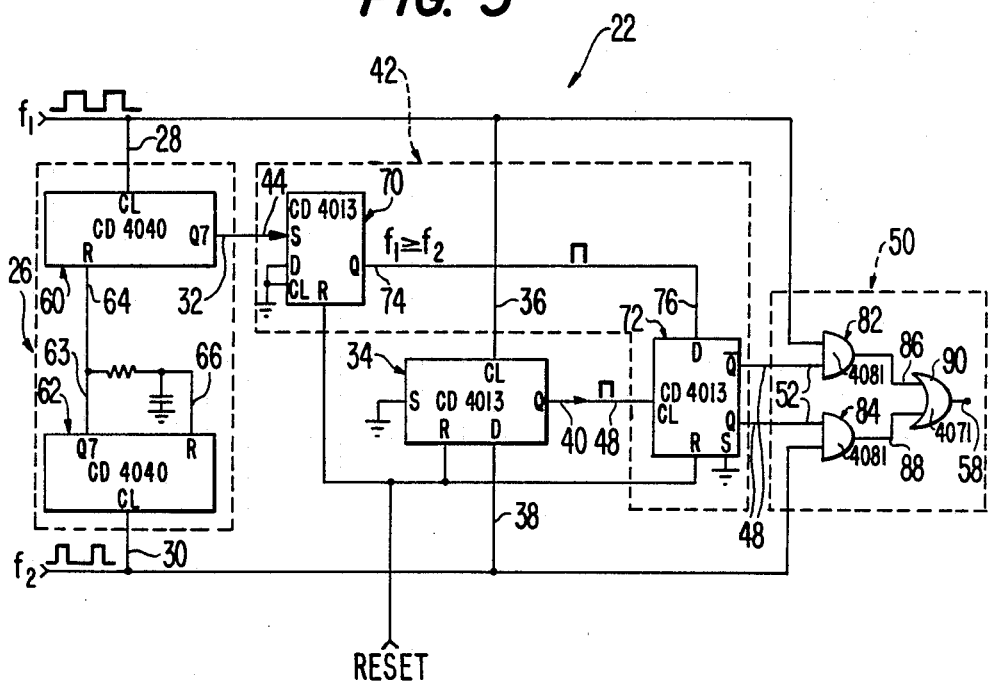

DIGITAL SYNCHRONIZING CIRCUIT FOR BRUSHLESS DC MOTOR

TECHNICAL FIELD

The present invention relates to systems for accelerating brushless DC motors rapidly through mechanical resonance points using commutation signals generated from the rotational velocity and position of the rotor prior to switching over to synchronous motor operation using commutation signals generated from an external signal source.

BACKGROUND ART

Brushless DC motors are in widespread use. A brushless DC motor employs a permanently magnetized rotor and electronic commutation to switch current to appropriate stator windings to cause the rotor to rotate to follow switched magnetic poles in the stator windings. Brushless DC motors may be commutated by signals generated from the rotational velocity and position of the rotor to cause the appropriate stator winding to be switched to sustain rotation. Furthermore, brushless DC motors may be commutated by an external frequency source to cause the rotor to rotate at a rotational velocity synchronous with the external signal source. Mechanisms for detecting the rotational velocity and position of the rotor include resolver windings, Hall effect devices, optical position sensors, etc.

When a brushless DC motor is accelerated from rest to a high velocity such as 70,000 rpm in an application such as driving a compressor, several mechanical resonance points are encountered. During acceleration of a brushless DC motor through mechanical resonance points, synchronous operation is difficult to sustain for the reason that if the mechanical resonance is severe the rotor can lose synchronous speed torque which will result in the motor stalling. Accordingly, in order to rapidly accelerate a brushless DC motor up to a high speed of the type used for driving compressors such as 70,000 rpm, it is highly desirable to rapidly accelerate the rotor through the mechanical resonance points by utilizing a commutating signal that is derived from the position and rotational velocity of the rotor which is not subject to stalling as is the case when the motor is commutated in a synchronous mode of operation.

U.S. Pat. No. 3,706,923 discloses a brushless DC motor acceleration system in which the rotor is accelerated with electronic commutation derived from the velocity and position of the rotor until a predetermined velocity is obtained at which point commutation is switched over to an external signal source. The motor switches from a closed loop feedback circuit to an open loop operation upon sustaining the synchronous speed. No provision is made in the '923 patent for switching the motor from internally generated electronic commutation which is controlled by the rotational velocity and position of the rotor to commutation controlled by an external signal source precisely when the internally generated pulses for switching the windings and the externally generated pulses for switching the windings are time coincident. Accordingly, the '923 patent has no mechanism for precisely controlling the crossover point between internally generated and externally generated commutation to insure that there is a minimum discontinuity in frequency and phase at the instant of transfer.

U.S. Pat. No. 3,979,651 discloses a motor operable in a direct current and synchronous mode. The '651 patent discloses a system for accelerating the rotor under the control of a commutation signal generated from the velocity and position of the rotor up to a point where the rotor reaches a first velocity after which the commutation signal is externally generated. An up/down counter having inputs respectively responsive to a reference clock and from a pulse source having a frequency directly proportional to the rotational velocity of the rotor is used to detect the point at which control of electronic commutation is switched from a signal derived from the rotation and position of the rotor to an external reference signal. The '651 patent does not disclose any mechanism for precisely controlling the point at which control of electronic commutation is transferred from a signal generated from the velocity and position of the rotor to an external signal source to produce a minimum discontinuity in frequency and phase at the instant of transfer.

U.S. Pat. No. 4,353,016 discloses a linear motor control system for a brushless DC motor having an acceleration circuit which utilizes pulses generated from the velocity and position of the rotor to control electronic commutation of the windings of the motor until a predetermined speed is reached at which point control of commutation of the motor windings is transferred to an external frequency source. The '016 patent does not disclose any mechanism for precisely controlling the point at which control of electronic commutation is transferred from a signal generated from the velocity and position of the rotor to an externally generated signal for controlling electronic commutation with a minimum of discontinuity in frequency and phase at the instant of transfer.

DESCRIPTION OF THE INVENTION

The present invention provides a brushless DC motor having precise control of the point at which control of electronic commutation by a signal which is a function of the position and rotational velocity of the rotor is transferred to an external signal source for controlling electronic commutation of the motor windings with a minimum of discontinuity in frequency and phase at the instant of transfer between the internal and external signal sources for controlling commutation. With the invention, it is possible to rapidly accelerate a brushless DC motor through mechanical resonance points which would present extreme difficulties for synchronous operation of the motor.

A brushless DC motor in accordance with the invention includes a source, coupled to the brushless DC motor, for producing pulses $f_1$ having a frequency which is proportional to rotational velocity and position of a rotor of the motor for controlling acceleration of the motor up to a first rotational velocity; a source of pulses $f_2$ for controlling the rotational velocity of the rotor for rotational velocities above the first rotational velocity; a gate, coupled to the source for producing pulses $f_1$ to the source of pulses $f_2$ and to at least one control signal for producing an output of the pulses $f_1$ when the at least one control signal has a first state and for producing an output of the pulses $f_2$ when the at least one control signal has a second state; a motor driving circuit having an input coupled to the output of the gate, for supplying power to the motor windings; a frequency detector, responsive to the pulses $f_1$ and $f_2$, for detecting when the pulses $f_1$ have a frequency equal to or greater than the frequency of the pulses $f_2$ and producing an output signal when the pulses $f_1$ have a frequency equal to or greater than the frequency of pulses $f_2$; a coincidence detector, coupled to the source for producing the pulses $f_1$ and to the source of the pulses $f_2$, having an output on which is produced an output signal when the pulses $f_1$ and $f_2$ are at least partially overlapping; and a bistable circuit, having an input coupled to the output of the frequency detector for detecting and an input coupled to the output of the coincidence detector, for producing the at least one control signal of the second state when the pulses $f_1$ and $f_2$ are at least partially overlapping and the output of the frequency detector is present and the control signal of the first state at least when the pulses are not at least partially overlapping. The source of pulses $f_2$ may be a variable frequency oscillator. The gate includes first and second AND gates each having first and second inputs and an output, the first input of the first AND gate is from the source for producing pulses $f_1$, the first input of the second AND gate is from the source of pulses $f_2$ and the second inputs are from different outputs of the bistable circuit with the different outputs being such that one of the outputs is an inversion of the other of the outputs, and the outputs of the AND gates are respectively inputs of an OR gate having an output coupled to the input of the motor driving circuit. The detector comprises a first multiple stage counter having a clock input coupled to the source for producing pulses $f_1$; a second multiple stage counter having a clock input coupled to the source of pulses $f_2$, one of the stages of the second counter being coupled to a reset input of the second counter and a reset input of the first counter, an identical state of the first counter which in the second counter is coupled to the reset of the first counter is coupled to the input of the bistable circuit. The bistable circuit comprises a first flip-flop having a set input coupled to the output stage of the first counter and an output having a high state when the frequency of pulses $f_1$ is equal to or greater than the frequency of the pulses $f_2$; and a second flip-flop having a data input coupled to the output of the first flip-flop, and a clock input coupled to the output of the coincidence detector. The coincidence detector comprises a flip-flop having a data input coupled to the source of pulses $f_2$, a clock input coupled to the source for producing pulses $f_1$ and an output coupled to the clock input of the second flip-flop. The source for producing pulses frequency $f_1$ comprises a signal generator for producing a signal which is a function of position and velocity of the rotor.

BRIEF DESCRIPTION OF DRAWINGS

FIG. 2 is a block diagram of the digital synchronizing circuit of FIG. 1.

FIG. 3 is a preferred embodiment of the digital synchronizing circuit of FIG. 2.

BEST MODE FOR CARRYING OUT THE INVENTION

Figure 1:
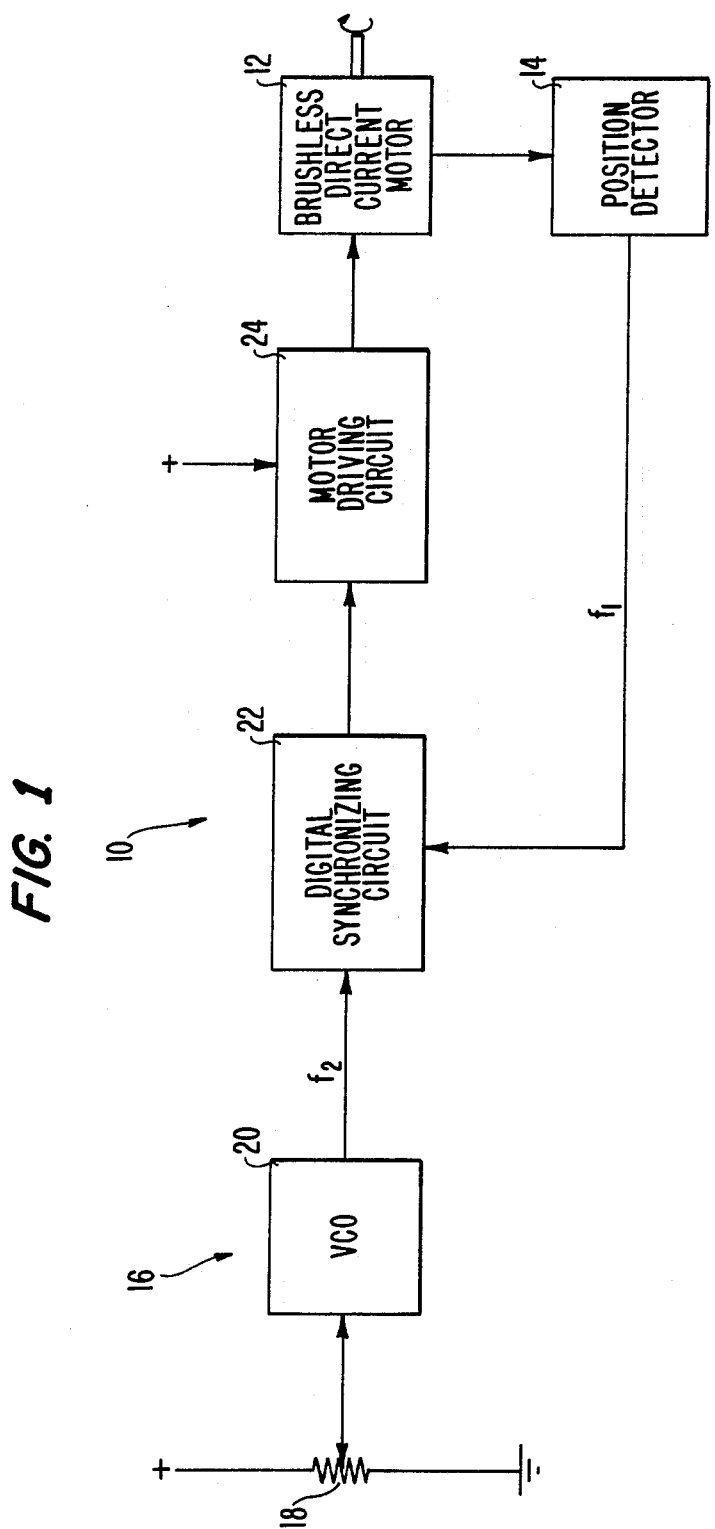
FIG. 1 is a block diagram of the present invention.

FIG. 1 illustrates a block diagram of the present invention. A brushless DC motor system 10 in accordance with the invention has the performance capability of rapid acceleration from rest to a first velocity with commutation controlling pulses $f_1$ being generated that are a function of the position and rotational velocity of the rotor of the brushless direct current motor by position detector 14. Position detector 14 may be any conventional source of an internally generated signal for controlling commutation which is a function of rotor position and velocity, such as, but not limited to, resolver windings, optical position detectors and magnetic position detectors. An external source of pulses 16 generates a pulse train $f_2$ which is used for controlling electronic commutation to control the rotational velocity of the brushless direct current motor 12 after the acceleration mode under the control of the internally generated pulses $f_1$ has been concluded. The external source of pulses $f_2$ preferably is of variable frequency and is used for controlling the rotational velocity of the rotor of the brushless direct current motor 12 from a first rotational velocity. The first rotational velocity to a second higher rotational velocity at which control of electronic commutation is transferred from the internally generated pulses $f_1$ to the externally generated pulses $f_2$ in a preferred embodiment of the present invention is chosen to be above one or more mechanical resonance points through which it would be difficult or impossible to accelerate the rotor of the brushless direct current motor 12 when operated in a synchronous mode of operation. In an embodiment of the invention in which the brushless direct current motor is used for driving a compressor, the rotational velocity at which electronic commutation is transferred from control of the internally generated pulses $f_1$ to the externally generated pulses $f_2$ is approximately 30,000 rpm with the external source 16 of the pulses $f_2$ controlling the commutation of the motor at rotational speeds from 30 to 70,000 rpm. The external source of pulses 16 is comprised of a potentiometer 18 which is connected between power supply potential and ground which produces a variable voltage connected to a conventional voltage controller oscillator 20 which outputs the pulses $f_2$ having a variable frequency which is directly proportional to the voltage coupled to the input of the voltage controlled oscillator from the potentiometer.

Digital synchronizing circuit 22 functions to selectively couple either the pulses $f_1$ generated by the position detector 14 or the pulses $f_2$ generated by the voltage controlled oscillator 20 to motor driving circuit 24 which functions as an inverter to apply current pulses to the stator windings of brushless direct current motor 12 in a conventional fashion. The motor driving circuit 24 may be any conventional current drive for a brushless direct current motor. Furthermore, the brushless direct current motor 12 may be of any conventional design. When the digital synchronizing circuit 22 couples the pulses $f_1$ to the motor driving circuit 24, the brushless direct current motor 12 is electronically commutated by the pulses generated by the position detector 14. When the digital synchronizing circuit 22 couples the pulses $f_2$ to the motor driving circuit 24, the brushless direct current motor 12 is electronically commutated by the externally generated pulses $f_2$.

FIG. 2 illustrates a block diagram of the digital synchronizing circuit 22 in accordance with the invention. Frequency detector 26 has a first input 28 which is connected to position detector 14 and a second input 30 which is connected to the voltage controlled oscillator 20. The frequency detector functions to produce a high level output on output 32 when the frequency of the pulses $f_1$ is equal to or greater than the frequency of the pulses $f_2$. Edge detector 34 has a first input 36 which is connected to the position detector 14 and a second input 38 which is connected to the voltage controlled oscillator 20. It should be noted that the duty cycle of the pulses $f_1$ is typically substantially greater than the duty cycle of the pulses $f_2$ which means that there is a substantial probability that even when the pulse trains $f_1$ and $f_2$ are synchronized in frequency, the high level states will be out of phase with respect to each other. The edge detector 34 functions to detect when there is at least a partial overlap of the high level states of the pulse trains $f_1$ and $f_2$. A high level pulse is produced on output 40 when there is at least a partial overlap of the high level states of the pulse trains $f_1$ and $f_2$. Latch circuit 42 has a first input 44 connected to the output 32 of frequency detector 26 and a second input 46 connected to the output 40 of the edge detector 34. The latch circuit 42 functions to produce one or more control signals on output 48 when the signals on the inputs 44 and 46 are at a high level. The output state of the latch circuit 42 is retained until it is reset by a reset (not illustrated). It should further be noted that only a single control signal is illustrated on the output 48 but that in a preferred embodiment of the digital synchronizing circuit 22 discussed below with reference to FIG. 3 that two control signals are output on the output 48 which have a relationship that one of the signals is an inversion of the other signals by respectively taking the control signals off of the non-inverting and inverting outputs of the latch circuit. Gating circuit 50 has one or more inputs 52 connected to the output 48 of the latch circuit 42, an input 54 connected to the position detector 14, and an input 56 connected to the voltage controlled oscillator 16. The gating circuit 50 functions to output pulses from the position detector 14 to the motor driving circuit 24 as long as the frequency of the pulses $f_2$ is greater than the frequency of the pulses $f_1$ and functions to output the pulses from voltage controlled oscillator 20 when the frequency of the pulses $f_1$ is equal to or greater than the frequency of the pulses $f_2$ and at least a partial overlap has been detected between the high state of pulse trains $f_1$ and $f_2$.

FIG. 3 illustrates a circuit schematic of a preferred implementation of the digital synchronizing circuit 22 of FIG. 2. Like reference numerals identify like parts in FIGS. 2 and 3. Integrated circuits are identified by their industry wide part or manufacturer's identification number. The frequency detector 26 is comprised of first and second identical counters 60 and 62. The input 28 of the first counter 60 is clocked by the pulse train $f_1$ and the input 30 of the second counter 62 is clocked by the pulse train $f_2$. The seventh stage of the twelve stages in counter 62 is coupled to the reset input 64 of counter 60. The output 32 from the first counter 60 is taken from an identical stage (7th) as the output 63 from the counter 62 which is applied to the reset input 64. It should be noted that the choice of the particular stage of the counters 60 and 62 to be used is governed by the degree of sensitivity required to detect the frequency relationship between the pulses $f_1$ and $f_2$. The output 63 from the second counter 62 is also connected to the reset input 66 to cause the counter to reset when a count reaches the seventh stage. Whenever the frequency of the pulses $f_1$ is equal to or greater than the frequency of the pulses $f_2$, a high level output is produced on output 32. Conversely, if the frequency of the pulses $f_1$ is less than the frequency of the pulses $f_2$, counter 60 will be reset before a high level output pulse is produced on output 32. The latch circuit 42 is comprised of a pair of flip-flops 70 and 72. Output 74 of flip-flop 70 is connected to data input 76 of flip-flop 72. The flip-flop 72 is clocked by the output 40 from edge detector 34 which is applied to input 48. Outputs from the flip-flop 72 are respectively produced on the non-inverting and inverting outputs 48. The gating circuit 50 is comprised of a first AND gate 82 and a second AND gate 84. The first AND gate 82 has an input from the position detector 14 and an input from the inverting output from flip-flop 72. The second AND gate 84 has a first input from the voltage controlled oscillator 20 and a second input from the non-inverting output of the flip-flop 72. The output 86 of the first AND gate 82 and the output 88 of the second AND gate 84 are respectively applied as inputs to OR gate 90. The output 58 of the OR gate is applied to the motor driving circuit 24. The RESET line is connected to each of the reset inputs R of the flip-flops to reset the flip-flops each time the motor is started.

While the invention has been described in terms of its preferred embodiment, it should be understood that numerous modifications may be made thereto without departing from the spirit and scope of the invention as defined in the appended claims. For example, it should be noted that while a preferred implementation of the invention is for driving an air compressor having several mechanical resonance points below an operating speed range, the invention may nevertheless be utilized in other applications, especially where it is desirable to rapidly accelerate motor with electronic commutation being controlled by signals generated as a function of the position and velocity of the rotor through a speed range containing one or more mechanical resonance points through which it would be difficult to accelerate the motor in a synchronous mode with commutation controlled by an external pulse source. It is intended that all such implementations and modifications fall within the scope of the appended claims.

I claim:

1. A brushless DC motor comprising:
   a pulse source, coupled to the brushless DC motor, for producing pulses $f_1$ which are proportional to rotational velocity and position of a rotor of the motor for controlling acceleration of the motor up to a first rotational velocity;
   a variable frequency pulse source of pulses $f_2$ for controlling the rotational velocity of the rotor for rotational velocities from the first rotational velocity to a second higher rotational velocity;
   a gating circuit, coupled to the pulse source for producing pulses $f_1$, to the pulse source of pulses $f_2$ and to a source of a control signal, for producing an output for the pulses $f_1$, when the control signal has a first state and for producing an output of the pulses $f_2$ when the control signal has a second state;
   a motor drive, having an input coupled to the output of the gating circuit, for supplying power to motor windings of the motor;
   a detector, responsive to the pulses $f_1$ and $f_2$, for detecting when the pulses $f_1$ have a frequency equal to or greater than a frequency of the pulses $f_2$ and producing an output signal when the pulses $f_1$ have a frequency equal to or greater than the frequency of the pulses $f_2$;
   a coincidence detector, coupled to the pulse source for producing the pulses $f_1$ and to the source of the pulses $f_2$, having an output on which is produced an output signal when the pulses $f_1$, and $f_2$ are at least partially overlapping; and
   a bi-stable circuit, having an input coupled to the output of the detector for detecting when the pulses $f_1$ have a frequency equal to or greater than a frequency of the pulses $f_2$ and an input coupled to the coincidence detector, for producing the control signal of the second state when the pulses $f_1$ and $f_2$ are at least partially overlapping and the output of the detector for detecting is present and the control signal of the first state at least when the pulses are not at least partially overlapping.

2. A brushless DC motor in accordance with claim 1 wherein:
the pulse source of pulses $f_2$ is a variable frequency oscillator.

3. A brushless DC motor in accordance with claim 1 wherein the gating circuit comprises:
first and second AND gates each having first and second inputs and an output, the first input of the first AND gate is from the pulse source for producing pulses $f_1$, the first input of the second AND gate is from the pulse source of pulses $f_2$ and the second inputs are from different outputs of the bistable circuit with the different outputs being such that one of the outputs is an inversion of the other of the outputs, and the outputs of the AND gates are respectively inputs of an OR gate having an output coupled to the input of the motor drive.

4. A brushless DC motor in accordance with claim 3 wherein the detector for detecting when the pulses $f_1$ have a frequency equal to or greater than a frequency of the pulses $f_2$ comprises:
a first multiple stage counter having a clock input coupled to the pulse source for producing pulses $f_1$; and
a second multiple stage counter having a clock input coupled to the source of pulses $f_2$, one of the stages of the second counter being coupled to a reset input of the second counter and a reset input of the first counter, an identical stage of the first counter, which in the second counter is coupled to the reset of the first counter, is coupled to the input of the bi-stable circuit.

5. A brushless DC motor in accordance with claim 4 wherein the bistable circuit comprises:
a first flip-flop having a set input coupled to the output stage of the first counter and an output having a high state when the frequency of pulses $f_1$ is equal to or greater than the frequency of the pulses $f_2$; and
a second flip-flop having a data input coupled to the output of the first flip-flop, and a clock input coupled to the output of the coincidence detector.

6. A brushless DC motor in accordance with claim 5 wherein the coincidence detector comprises:
a flip-flop having a data input coupled to the source of pulses $f_2$, a clock input coupled to the pulse source for producing pulses $f_1$, and an output coupled to the clock input of the second flip-flop.

7. A brushless DC motor in accordance with claim 1 wherein:
the pulses $f_1$ vary in frequency through a range including at least one mechanical resonance point of a load being driven by the rotor of the motor.

8. A brushless DC motor in accordance with claim 2 wherein:
the pulses $f_1$ vary in frequency through a range including at least one mechanical resonance point of a load being driven by the rotor of the motor.

9. A brushless DC motor in accordance with claim 3 wherein:
the pulses $f_1$ vary in frequency through a range including at least one mechanical resonance point of a load being driven by the rotor of the motor.

10. A brushless DC motor in accordance with claim 4 wherein:
the pulses $f_1$ vary in frequency through a range including at least one mechanical resonance point of a load being driven by the rotor of the motor.

11. A brushless DC motor in accordance with claim 5 wherein:
the pulses $f_1$ vary in frequency through a range including at least one mechanical resonance point of a load being driven by the rotor of the motor.

12. A brushless DC motor in accordance with claim 6 wherein:
the pulses $f_1$ vary in frequency through a range including at least one mechanical resonance point of a load being driven by the rotor of the motor.

13. A brushless DC motor in accordance with claim 6 further comprising:
a reset input coupled to each of the flip-flop to reset each of the flip-flops each time the motor is started.

14. A brushless DC motor in accordance with claim 1 wherein the means for producing an output of the pulses $f_1$ comprises:
first and second AND gates each having first and second inputs and an output, the first input of the first AND gate is from the means for producing pulses $f_1$, the first input of the second AND gate is from the source of pulses $f_2$ and the second inputs are from different outputs of the means for producing the control signal with the different outputs being such that one of the outputs is an inversion of the other of the outputs, and the outputs of the AND gates are respectively inputs of an OR gate having an output coupled to the input of the means for supplying power to motor windings.

15. A brushless DC motor in accordance with claim 14 wherein the means for producing comprises:
a first multiple stage counter having a clock input coupled to the means for producing pulses $f_1$; and
a second multiple stage counter having a clock input coupled to the source of pulses $f_2$, one of the stages of the second counter being coupled to a reset input of the second counter and a reset input of the first counter, an identical stage of the first counter, which in the second counter is coupled to the reset of the first counter, is coupled to the input of the bistable circuit.

16. A brushless DC motor in accordance with claim 15 wherein the means for producing the control signal comprises:
a first flip-flop having a set input coupled to the output stage of the first counter and an output having a high state when the frequency of pulses $f_1$ is equal to or greater than the frequency of the pulses $f_2$; and
a second flip-flop having a data input coupled to the output of the first flip-flop, and a clock input coupled to the output of the means having an output.

17. A brushless DC motor in accordance with claim 16 wherein the means for producing an output signal when the pulses $f_1$ have a predetermined frequency relationship to the pulses $f_2$ comprises:
a flip-flop having a data input coupled to the source of pulses $f_2$, a clock input coupled to the means for producing pulses $f_1$, and an output coupled to the clock input of the second flip-flop.

18. A brushless DC motor comprising:

means, coupled to the brushless DC motor, for producing pulses $f_1$ which are proportional to rotational velocity and position of a rotor of the motor for controlling acceleration of the motor up to a first rotational velocity;

a source of pulses $f_2$ for controlling the rotational velocity of the rotor for rotational velocities above the first rotational velocity;

means, coupled to the means for producing pulses $f_1$, to the source of pulses $f_2$ and to a source of a control signal, for producing an output of the pulses $f_1$ when the control signal has a first state and for producing an output of the pulses $f_2$ when the control signal has a second state;

means, having an input coupled to the output of the means for producing an output of the pulses $f_1$, for supplying power to motor windings of the motor;

means, responsive to the pulses $f_1$ and $f_2$, for producing an output signal when the pulses $f_1$ have a predetermined frequency relationship to the pulses $f_2$;

means, coupled to the means for producing the pulses $f_1$ and to the source of the pulses $f_2$, having an output on which is produced an output signal when the pulses $f_1$ and $f_2$ are at least partially overlapping; and means, having an input coupled to the output of the means for producing an output signal when the pulses $f_1$ have a predetermined frequency relationship to the pulses $f_2$ and an input coupled to the means having an output on which is produced the output signal, for producing the control signal of the second state when the pulses $f_1$ and $f_2$ are at least partially overlapping and the output of the means for producing an output signal when the pulses $f_1$ have a predetermined frequency relationship to the pulses $f_2$ is present and the control signal of the first state at least when the pulses are not at least partially overlapping.

19. A brushless DC motor in accordance with claim 18 wherein:

the pulses $f_1$ vary in frequency through a range including at least one mechanical resonance point of a load being driven by the rotor of the motor.

20. A brushless DC motor in accordance with claim 18 wherein:

the source of pulses $f_2$ is a variable frequency oscillator.

* * * * *